United States Patent [19]
Barisa

[11] Patent Number: 4,702,450
[45] Date of Patent: Oct. 27, 1987

[54] MOUNTING FOR ASTRONOMICAL BINOCULARS

[76] Inventor: Robert J. Barisa, R.D. #1, Box 210, Scenery Hill, Pa. 15360

[21] Appl. No.: 825,747

[22] Filed: Feb. 3, 1986

[51] Int. Cl.$^4$ ............................................. E04G 3/00
[52] U.S. Cl. .............................. 248/292.1; 248/123.1; 248/284
[58] Field of Search ...................... 248/291, 292.1, 278, 248/280.1, 281.1, 284, 285, 286, 287, 123.1, 124; 350/567; 354/293; 173/43

[56] References Cited

U.S. PATENT DOCUMENTS

| | | | |
|---|---|---|---|
| 2,733,035 | 1/1956 | Rocheleau | 248/286 X |
| 3,707,625 | 12/1972 | Hustead | 248/124 X |
| 3,749,342 | 7/1973 | Perrine | 248/123.1 |
| 4,163,538 | 8/1979 | Galione | 248/278 |
| 4,241,891 | 12/1980 | Rudolph | 248/280.1 X |
| 4,364,535 | 12/1982 | Itoh et al. | 350/567 X |

Primary Examiner—Ramon O. Ramirez
Attorney, Agent, or Firm—William J. Ruano

[57] ABSTRACT

An astronomical mounting for binoculars or other viewing devices such as a camera or telescope. It comprises a support mounted on one end of a parallelogram linkage so that the viewing device, when raised, will always be horizontal. The other end of the parallelogram linkage is supported on a tripod. Universal adjustment is provided to enable the viewing device to be moved about a circle in either a horizontal plane or a vertical plane. An adjustable weight is provided on the tripod end of the parallelogram linkage to counterbalance the weight of the viewing device. The device enables the viewer to lie in a comfortable position even when viewing the sky directly above.

3 Claims, 10 Drawing Figures

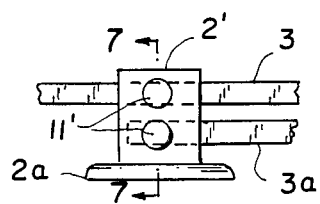
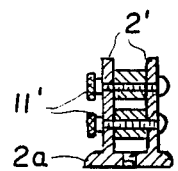
Fig. 6　　　　Fig. 7
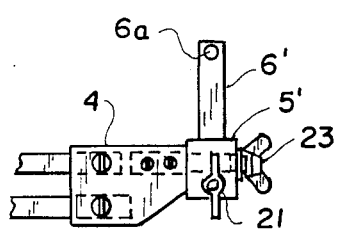
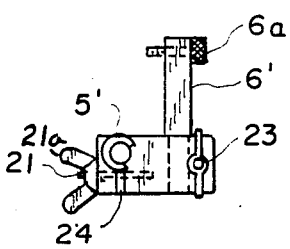
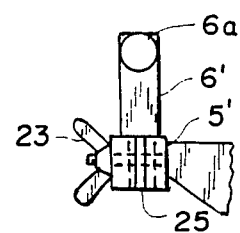
Fig. 8　　　Fig. 9　　　Fig. 10

4,702,450

MOUNTING FOR ASTRONOMICAL BINOCULARS

This invention relates to a mounting for binoculars and other viewing devices for use in astronomy.

BACKGROUND OF THE INVENTION

An outstanding disadvantage of known types of mountings used for binoculars in astronomy is that they are uncomfortable to the viewer and require frequent physical contact with the binoculars and their mount. Generally, a tripod is directly underneath the binoculars providing discomfort, particularly when viewing stars and the like directly overhead.

An object of the present invention is to provide a binocular mount that overcomes the above-named disadvantages.

SUMMARY OF THE INVENTION

The invention comprises an astronomical mounting for a viewing device, such as binoculars, embodying adjusting means for selectively locating the device in any position along a circle, in either a vertical or horizontal plane, and including a parallelogram linkage support, to enable the sky to be explored comfortably even when viewing directly above.

Other objects and advantages of the invention will become more apparent from a study of the following description taken with the accompanying drawings wherein;

BRIEF DESCRIPTION OF THE DRAWING

FIG. 6 is a modification of spacer block 7 for support plates 2, 2 shown in FIG. 1 and FIG. 2;

FIG. 7 is a vertical cross-sectional view taken along line 7—7 of FIG. 6;

FIG. 8 is a modification of adjustable support 5 shown in FIG. 2;

FIG. 9 is a side view thereof taken from the right of FIG. 8; and

FIG. 10 is a rear view of FIG. 8.

DESCRIPTION OF THE PREFERRED EMBODIMENT

Figure 1:
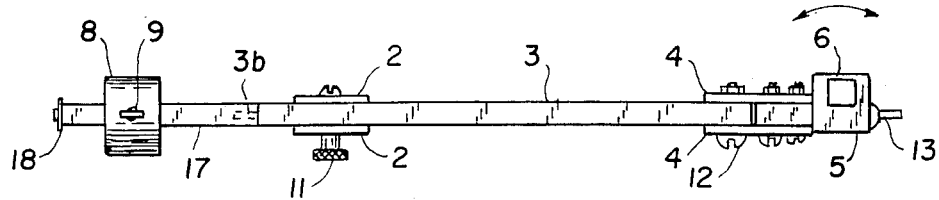
FIG. 1 is a top view of a mounting for a viewing device, such as binoculars, which device embodies the principles of the present invention.
Figure 2:
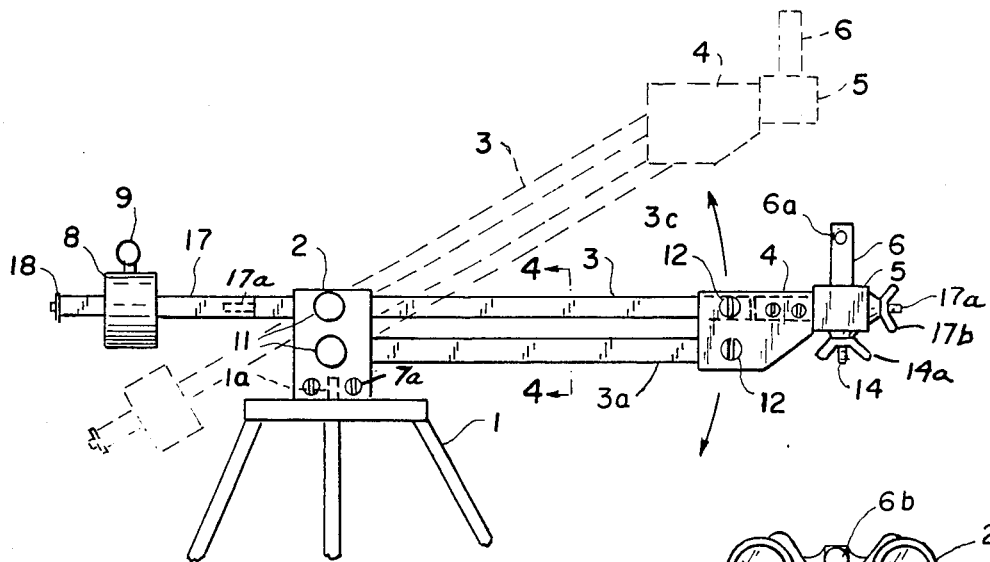
FIG. 2 is an elevational view thereof.
Figure 3:
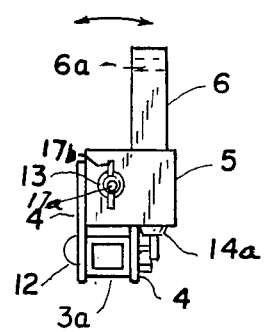
FIG. 3 is an end view as seen from the right of FIG. 2.
Figure 4:
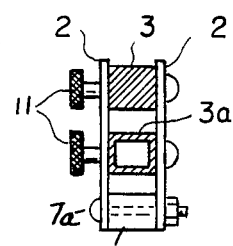
FIG. 4 is a vertical cross-secitonal view taken along line 4—4 of FIG. 2.

Referring more particularly to FIGS. 1 to 4 inclusive numeral 1 denotes a conventional tripod as used in astronomy having supported thereon through the conventional threaded hole and bolt 1a, a support in the form of two parallel support plates 2,2 which are rigidly interconnected at the bottom by a pair of bolts 7a, as more clearly shown in FIGS. 2 and 4, and having thumbscrews 11,11 for selectively clamping the ends of a parallelogram linkage 3,3a of rectangular cross-section.

Figure 5:
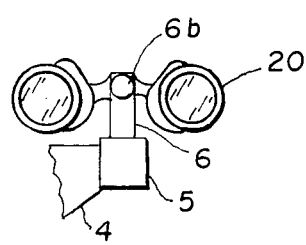
FIG. 5 is a fragmentary view of supports 5 and 6 of FIG. 2, including a pair of binoculars 20 mounted thereon.

The other end of the parallelogram linkage is pivotally secured to a viewing device support 4 comprising a pair of support plates 4,4, as shown more clearly in FIG. 3, which are interconnected by bolts 12,12 which are tightened firmly but yet allow movement of parallelogram linkage 3,3a. Adjustable support block 5 rigidly carries screw threaded shaft 17a on which block 5 can be adjustably rotated throughout an angle of 360° and maintained at any position in a vertical plane by a wing nut 17b. An adjustable viewing device support 6 is rotatably mounted on block 5 and can be rotated through a 360° angle in a horizontal plane and maintained in any desired position by tightening of a wing nut 14a. A hole 6a is provided in support 6 to enable mounting of any viewing device; such as, for example, a pair of binoculars 20, as shown in FIG. 5, which has a thumb nut 6b, or the like, that projects through hole 6a shown in FIG. 2. It should be noted that other viewing devices, such as a camera, or a small telescope, may be similarly mounted.

A balancing weight 8 is slidably mounted on an extension 17 which is screw threadedly connected to a threaded shaft 17a rigidly secured to the left end of link 3. A washer 18 is rigidly secured to the end of shaft 17 to serve as a limit stop for the weight 8. The purpose of the weight 8 is to exactly counterbalance the weight of the binoculars 20 or other viewing device mounted at the other end of the parallelogram. After the weight is slid to the proper balancing position, the thumb screw 9 is turned to tighten the hold on extension 17.

In operation, after a viewing device, such as binocular 20, is mounted on support 6, at the desired position, the weight 8 is slid to a balancing position and tightened by thumb screw 9. Thumb nuts 11,11 are loosened or tightened to provide the balance movement, such as shown in dotted lines, with enough friction on parallelogram linkage arms 3, 3a, as shown in FIG. 2, to allow the balance movement to be free but steady.

Therefore, it will be seen that the astronomer can view with great ease even objects that are directly above in the sky without interference of the tripod 1 and need not grasp any of the parts of the support, once the adjustment has been made.

The present invention permits the viewer to sit or recline directly under the binoculars and allows the same ease and comfort in overhead viewing as in other directions. Once the binoculars are positioned there is no need for any continual physical contact with the device. The viewer can relax and not strain himself by trying to keep motionless. All adjustments are close at hand and no tools are necessary.

FIG. 6 and FIG. 7 show a modification wherein instead of bolting the bottom part of support plates 2,2 by the bolts 7a as shown in FIGS. 3 and 4, a solid integral plate 2a is provided instead to join support plates 2[1] by thumb nuts 11[1].

FIGS. 8, 9 and 10 show a modification of the support for the viewing device which comprises a slit 24 in adjustable support 5[1] which slit can be partially closed by tightening a wing nut 21a on threaded shaft 21. Similarly, on the end thereof, another slit 25 is provided in support 5 to provide springy ends which may be clamped together to decrease the size of the slit and provide a firm hold on the viewing device support 6[1].

An E clip serves as an end stop.

Thus it will be seen that I have provided a novel mount for binoculars or other astronomical viewing device, such as a camera or small telescope, which enables the astronomer to sit or recline underneath the viewing device and make any needed adjustments with great ease. Also, I have shown the construction wherein the astronomer can view with great comfort even the sky directly above him without interference of the tripod and without the necessity of handling any part of the mounting once the parts are adjusted.

While I have illustrated and described several embodiments of my invention, it will be understood that these are by way of illustration only and that various changes and modifications may be contemplated in my invention and within the scope of the following claims:

I claim:

1. An astronomical mounting for a viewing device, such as binoculars, comprising a support for said device, adjusting means for selectively rotating said support to any position along a circle in either a vertical or horizontal plane, including a parallelogram linkage having one end connected to said support and a tripod supporting the other end, insuring an unchanged horizontal plant of said support with any vertical plane change in the parallelogram linkage, an extension of said parallel linkage projecting from said tripod in the opposite direction from said viewing device, an adjustably slidable weight on said extension for counterbalancing the weight of said viewing device, screw means for holding said weight in any selected position on said extension, said tripod including knob means for selectively tightening and holding said other end of said parallelogram linkage in any desired position in a vertical plane, a block connected to said one end of said parallelogram linkage, and wherein said support has a hole for receiving a shaft extending from said block, said support having a second hole at right angles to said first-mentioned hole for receiving a threaded portion of a shaft of a viewing device supporting means, a pair of wing nuts, one on each of said shafts for clamping said support in any selected position along said vertical and horizontal plane whereby the sky can be explored comfortably, including directly overhead, without the necessity of holding said viewing device.

2. A mounting as recited in claim 1 wherein said viewing device supporting means has a hole for receiving a corresponding shaft for said viewing device.

3. An astronomical viewing device as recited in claim 1 wherein said support and adjusting means comprises a block having a hole receiving a shaft from said support, a slit in said block, adjustable fastening means for selectively decreasing the width of said slit to tightly hold said block in any selected position along a horizontal circle in a horizontal plane, and a second slit in said block at right angles to said first slit, and a second hole in said block at right angles to said first hole which receives a shaft from a viewing device support, and a second adjustable fastening means for selectively decreasing the width of said second slit to tightly hold said viewing device support in any selected position along a circle in a vertical plane.

* * * * *